United States Patent [19]

Mullersman

[11] Patent Number: 4,577,145
[45] Date of Patent: Mar. 18, 1986

[54] CHARGING SYSTEM HAVING ELECTROMAGNETIC FIELD MEANS FOR DISTINGUISHING BETWEEN PRIMARY AND SECONDARY BATTERIES

[75] Inventor: Ferdinand H. Mullersman, Gainesville, Fla.

[73] Assignee: General Electric Company, Gainesville, Fla.

[21] Appl. No.: 659,917

[22] Filed: Oct. 11, 1984

[51] Int. Cl.⁴ .................... H02J 7/00; H01M 10/44
[52] U.S. Cl. ........................................ 320/2; 320/3; 320/48; 429/7; 429/10
[58] Field of Search .................... 320/2-5, 320/13, 14, 20-24, 35, 36, 48; 429/7, 10, 92, 93, 96, 97

[56] References Cited

U.S. PATENT DOCUMENTS

| | | | |
|---|---|---|---|
| 3,070,748 | 12/1962 | Worobey et al. | 320/2 |
| 3,506,902 | 4/1970 | Sullivan | 320/2 |
| 3,622,396 | 11/1971 | Fernandez et al. | 250/215 |
| 3,665,285 | 5/1972 | Mullersman et al. | 320/2 |
| 3,675,108 | 7/1972 | Nicholl | 320/2 |
| 3,803,475 | 4/1974 | Anichini | 320/13 |
| 3,864,173 | 2/1975 | Butschkau | 429/10 |
| 4,044,300 | 8/1977 | Dupuis et al. | 320/48 X |
| 4,147,163 | 4/1979 | Newman et al. | 320/2 X |
| 4,147,838 | 4/1979 | Leffingwell | 320/2 X |
| 4,213,079 | 7/1980 | Mullersman | 320/2 |
| 4,229,686 | 10/1980 | Mullersman | 320/2 |
| 4,284,944 | 8/1981 | Iwanaga | 320/48 |
| 4,288,733 | 9/1981 | Bilanceri et al. | 320/2 |
| 4,310,606 | 1/1982 | Maida | 320/48 X |
| 4,382,219 | 5/1983 | Holme et al. | 320/2 |
| 4,453,119 | 6/1984 | Staler et al. | 320/39 |

Primary Examiner—R. J. Hickey
Attorney, Agent, or Firm—Henry J. Policinski

[57] ABSTRACT

A battery charging system is provided for charging a rechargeable batteries and for distinguishing the rechargeable battery from a non-rechargeable battery. The charging system establishes an electromagnetic field proximate the battery. A circuit within the battery enters a resonant condition in response to the electromagnetic field and the resonant condition is sensed by the charging system to switch the charging system from a non-charging mode to a charging mode.

21 Claims, 3 Drawing Figures

CHARGING SYSTEM HAVING ELECTROMAGNETIC FIELD MEANS FOR DISTINGUISHING BETWEEN PRIMARY AND SECONDARY BATTERIES

TECHNICAL FIELD OF THE INVENTION

This invention relates to rechargeable batteries and more particularly to a system for recharging rechargable, or secondary, batteries but preventing the recharging of non-rechargeable, or primary, batteries.

BACKGROUND

There are available to the consumer an ever-increasing number of portable battery operated devices, and those devices create an ever-increasing demand for batteries to serve as power sources. Conventionally, primary batteries such as carbon-zinc or alkaline batteries have been used as power sources, but since these primary batteries are typically not designed for recharging, the consumer is forced to continue purchasing new batteries as the old ones are drained.

Secondary batteries such as nickel-cadmium batteries are available which can repeatedly be recharged and reused for significant number of charge/discharge cycles. Such secondary batteries may be made with terminals and case configurations identical to primary batteries so as to be useable in the relatively large number of devices designed for primary batteries. In addition, such secondary batteries can also be associated with battery chargers useful in recharging the secondary batteries. Providing chargers for such secondary batteries creates the opportunity for insertion of primary batteries, having the same size and shape configuration, into the charger by an unwary consumer, even though such primary batteries are not intended to be recharged. It has been found that many carbon-zinc and alkaline primary batteries, if subjected to charging current, will eventually release electrolyte which can corrode and damage the surrounding energy-using device. Charging of such primary batteries may also produce other adverse effects.

In prior art approaches, in order to provide for charging of nickel-cadmium batteries while avoiding the adverse effects associated with recharging primary batteries, the nickel-cadmium batteries have been made of special size or shape to distinguish them from the non-rechargeable or primary batteries so that only the rechargeable battery will physically fit into a charger for recharging. Other prior art approaches have provided the rechargeable battery with a third contact terminal (in addition to the two contact terminals used to discharge energy from the battery) which is used to charge the battery. A non-rechargeable battery not having the third charging contact terminal cannot be charged in the charger. Another prior art approach provides for the insertion of a uni-directional current flow device into the non-rechargeable battery so that current may flow from the battery during discharge but cannot flow through the battery in the reverse direction during charging. Each of these prior art approaches has not proved to be entirely satisfactory at least for the reason that they each involve additional or special parts or components and hence increase the cost of the battery.

SUMMARY OF THE INVENTION

In view of the foregoing, it is the general purpose of the present invention to provide a rechargeable battery system including a secondary battery and a battery charging circuit which charges secondary batteries of "standard" size and shape and which avoids the possibility of providing recharging current to a primary battery. More particularly, it is an object of the invention to provide a rechargeable battery and a battery charging circuit which cooperate for recharging of secondary batteries by enabling the charging circuit to deliver charge current when a secondary battery is inserted therein but leaving the charging circuit nonfunctional if a primary battery of the same size and terminal configuration is inserted into the charging circuit.

In accordance with one aspect of the invention, it is an object to provide a rechargeable secondary battery having a size and configuration which permits the secondary battery to be directly substituted for a primary battery in an energy-using device while at the same time accommodating a circuit means in the battery which indicates the fact that it is rechargeable to a charging system.

In practicing one aspect of the present invention, it is an object to provide a battery charging system for charging secondary batteries in which the battery indicates its identity to the charging circuit (i.e., primary or secondary) in response to a signal to the battery from the circuit.

Other objects and advantages will become apparent from the following detailed description when taken in conjunction with the drawings.

SUMMARY OF THE INVENTION

Briefly stated, the present invention provides in one form, a signal means in the battery charging system provides an electromagnetic signal to the secondary battery for determining the presence of a predetermined characteristic of the secondary battery which distinguishes it from a primary battery. A circuit means in the secondary battery is responsive to the electromagnetic signal for generating an indication that the secondary battery is in fact a rechargeable battery. An enabling means is responsive to the indication from the circuit means for enabling the battery charging circuit to deliver charge current to the battery only in response to the indication from the circuit means.

Included in the battery housing is a resonance means which is responsive to the electromagnetic radiation from the system for indicating to the system that the battery is a rechargeable type. The load terminals of the secondary battery are adapted to engage the charging terminals of the charging circuit and to receive charging current therefrom.

While the invention will be described in connection with a certain preferred embodiment, there is no intent to limit it to that embodiment. On the contrary, the intent is to cover all alternatives, modifications and equivalents included within the spirit and scope of the invention as defined by the appended claims.

DETAILED DESCRIPTION OF THE PREFERRED EMBODIMENT

Figure 1:
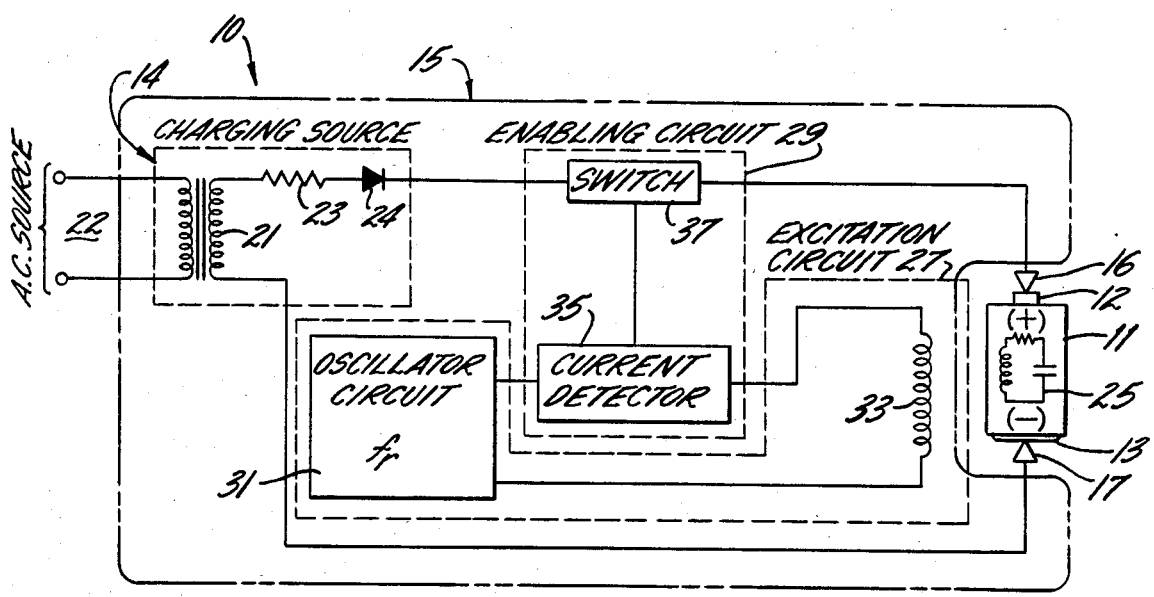
FIG. 1 is a schematic diagram of a battery charging system according to the invention.

Turning to the drawings, in referring first to FIG. 1, a battery charging system includes a charging circuit shown generally at 10 and having a first non-charging mode and a second charging mode. The charging system includes a charging source 14 and a secondary battery 11 (e.g., a nickel-cadmium cell). The battery 11, illustrated as a standard cylindrical cell, has first and second external load terminals 12 and 13, respectively, wherein the former is the positive terminal and the latter is the negative terminal. The terminals are for the purpose of connecting the battery to an energy-using device for the delivery of electrical energy thereto. The battery charging system also includes a case 15 for receiving the battery 11 and first and second charging contacts 16 and 17 arranged to electrically engage the battery load terminals 12 and 13 when the battery 11 is received in the case 15. Within the charging source 14 is a transformer 21 adapted to be coupled to a conventional a-c line 22, an impedance 23 to control the charging current, and a diode 24 for half-wave rectification.

In accordance with the invention, in order to prevent the intentional or accidental recharging of a primary (i e , non-rechargeable) battery by the battery charging system, the system includes resonance or indicating means in the form of a passive tank circuit 25 in the secondary battery 11 which is responsive to a exitation circuit 27 in the system. Passive circuit 25 is responsive to the electromagnetic field established by excitation circuit 27 to indicate to an enabling circuit 29 that the battery is a secondary battery (as opposed to a primary battery). In response to an indication by the battery 11 that it is a secondary battery, the enabling circuit 29 connects the charging source 14 to the charging contacts 16 and 17 of the system.

Preferably the passive circuit 25 contains elements whereby in combination their equivalent circuit comprises inductance, capacitance and resistance in an electrical configuration commonly refered to as a "tank circuit". In an idealized tank circuit, the three circuit elements can be in series or parallel. In the tank circuit 25, the inductive and capacitive reactances of the circuit are equal for a specific electrical frequency. For this specific frequency, the equality between the inductive and capacitive reactances result in resonance of the circuit. The capacitive and inductive reactance, being opposite in character, cancel at resonance leaving the resistance component of the tank circuit 25 as the only current limiting element. Furthermore, the aforementioned reactances nearly cancel over a band of frequencies immediately above and below the resonant frequency, and therefore the resistance component is the predominant current limiting element over a band of frequencies about the resonant frequency.

Accordingly, the tank circuit 25 is resonant at or near the resonant frequency and provides a resistance of a predetermined magnitude which establishes the load presented by the tank circuit 25. This load at the resonant frequency, is less than the load presented by the tank circuit 25 for frequencies departing from the resonant frequency.

In order to provide for recognition of the passive tank circuit 25 in a rechargeable battery 11, the excitation circuit 27 is provided with an oscillator circuit 31 which excites signal means in the form of a radiating device or or coil 33 at the predetermined resonant frequency fr of the tank circuit 25 contained within the battery 11. The coil 33 is positioned in physical relation to the battery engaging contacts 16 and 17 so as to radiate an electromagnetic field and to provide electromagnetic coupling between coil 33 and the tank circuit 25. When the tank circuit 25 is coupled to an oscillator 31 oscillating at the resonant frequency of the tank circuit, the current from the oscillator 31 and through the coil 33 will be significantly higher than the current from the oscillator when a battery without a complementary tank circuit 25 is inserted in the charger or when no battery is in the charger.

In order to detect or sense the higher rate of current flow through oscillator 31 and coil 33 resulting from coupling to the resonant passive circuit 25 in the battery 11, the enabling circuit 29 includes a current detector 35 interposed between the oscillator circuit 31 and the coil 33. When the current detector 35 senses the higher current through the coil 33—which is indicative of the lowered impedance presented by the tank circuit 25—the current detector 35 activates a switch 32 in the enabling circuit 29. Activation of switch 32 switches the charging circuit from a non-charging mode to a charging mode and permits charging current to flow from the charging source 14 to the battery 11.

In contrast to the operation of the battery charging system with the secondary battery 11, the current in the excitation circuit 27 is much lower when a primary battery is substituted for the battery 11 between the contacts 16 and 17. Since a primary battery is without an energy absorbing tank circuit, a substantial increase the current in the excitation circuit 27 will not occur when the primary battery is inserted in the charger. Therefore, the current detector 35 will not activate the switch 32. As a result of the primary battery not including the passive circuit 25, the battery will not be charged even though it is in place between the contacts 16 and 17 of the charging system and a-c power is applied.

Figure 2:
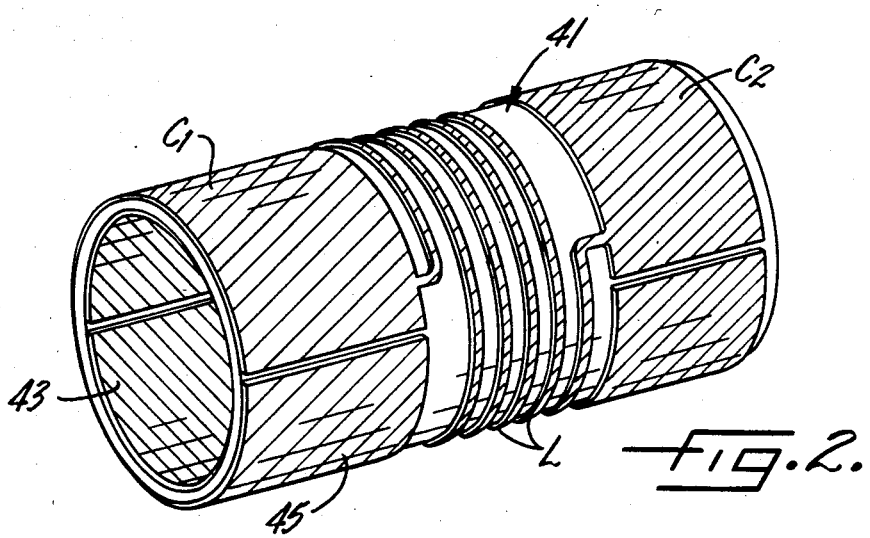
FIG. 2 is a perspective view of an outer sleeve for the battery in FIG. 1, wherein the sleeve includes a conductive pattern which forms a passive circuit.

Referring now to FIG. 2, the indicating means in the form of passive circuit 25 on the secondary battery 11 is provided by a printed circuit on a dielectric battery sleeve 41 shaped as a hollow cylinder. The conventional metal container (not shown) of a cylindrical secondary cell is received inside the sleeve 41. The printed circuit includes a conductive inner surface 43 and a conductive outer surface 45 which cooperate to form a tank circuit having a resonant frequency $f_r$. In order to keep the conductive surface 43 of the sleeve 35 electrically isolated from the metal container of the battery, an insulating sleeve (not shown), such as a polyethylene insulator, may be placed between the sleeve 41 and the metal container.

In order to form the passive circuit 25 on the dielectric sleeve 41, the conductive inner and outer surfaces 43 and 45, respectively, are formed in patterns which cooperate to form capacitive, inductive and resistive elements. Specifically, the material out of which outer conductive 45 is made establishes a capacitor at each end of the cylindrical sleeve 41. These plates are connected by an inductance L formed by a helical pattern in the central region of the conductive outer surface. The conductive inner surface 43 extends the full length of the sleeve acting as a counter plate for the two outer capacitor plates, and acting in cooperation with the sleeve dielectric to form capacitors $C_1$ and $C_2$. Conductive inner surface 43 also provides a conductive connection between capacitors $C_1$ and $C_2$.

Figure 3:
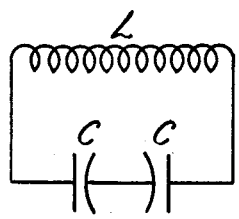
FIG. 3 is a schematic diagram of the passive circuit formed on the sleeve in FIG. 2.

Capacitors $C_1$ and $C_2$ are joined to the inductance L. The result of such a combination of capacitance and inductance is a "tank circuit" configuration as shown in FIG. 3. The two capacitors $C_1$ and $C_2$ formed by the patterns of the conductive surfaces 43 and 45 have equal capacitance. Because the two capacitors $C_1$ and $C_2$ are in series, the effective capacitor in the tank circuit has a capacitance value C equal to one-half the capacitance of either capacitor. The resonant frequency of such circuit is $f_r = \frac{1}{2} LC$.

Preferably, the conductive material comprising the "tank circuit" elements $C_1$, $C_2$ and L are of a metal such as aluminum which may be deposited on the sleeve 41 by plating, vacuum deposition or other well-known processes. The conductivity of the conductive material and the cross section of the conductors, particularly in the inductance element, will establish the magnitude of the resistance element in the tank circuit. The interior and exterior capacitor plates have a break in the metal film along the longitudinal axis of the cylinder formed by the sleeve 41 in order to avoid producing undesired shorted turns.

It is highly advantageous to provide the passive circuit 25 by the foregoing construction since it requires no mechanical or solder connections to fabricate a tank circuit 25. Although the printed circuit configuration of FIG. 2 is preferred, other configurations may also be used to implement a tank circuit. By utilizing a printed circuit on the sleeve 41 to implement the passive circuit 25, the housing of the battery 11 is not modified to an extent which makes the secondary battery no longer a direct substitute for primary batteries in energy-using devices.

I claim:

1. A battery charging system adapted to distinguish a rechargeable battery type from a non-rechargeable type, both said types being of substantially similar shape and size, said system comprising, in combination:
    a rechargeable battery circuit having a first non-charging mode and a second charging mode, said circuit having first and second contacts arranged for engagement with the first and second external load terminals, respectively, of said rechargeable battery;
    a radiating device for radiating an electromagnetic field proximate to said battery when the battery is placed in engagement with said contacts of said charging circuit;
    said rechargeable battery including indicating means responsive to the electromagnetic field for providing an indication distinguishing said rechargeable battery from a non-rechargeable battery; and
    enabling means responsive to the indication from said indicating means and in response thereto enabling the charging mode of said charging circuit, whereby said charging circuit will be enabled for charging only batteries of the rechargeable type.

2. The combination as set out in claim 1 in which said indicating means is resonant at a particular frequency of the electromagnetic field, and said enabling means is responsive to said resonance to enable the charging circuit to charge the battery.

3. The combination as set out in claim 1 wherein said indicating means is an electrical circuit comprising an inductance and a capacitance.

4. The combination as set out in claim 1 wherein said indicating means is a hollow, cylindrical sleeve which fits over a cylindrical outer surface of said rechargeable battery.

5. The combination as set out in claim 3 wherein said electrical circuit resonates in the presence of the electromagnetic field generated by said radiating device.

6. The combination as set out in claim 1 wherein said radiating device comprises an oscillator and a coil.

7. The combination as set out in claim 1 wherein said indication distinguishing said rechargeable battery from a non-rechargeable battery is an increase in current through said radiating device.

8. The combination as set out in claim 7 wherein the increase in current through said radiating device is detected by said enabling means.

9. The combination as set out in claim 6 wherein said enabling means comprises a current detection circuit which is responsive to an increase in current flow in said radiating device said increase comprising the indication from said indicating means that said battery is a secondary battery.

10. A rechargeable battery for use in a battery charging system which includes a battery charger having a pair of charging contacts adapted to alternatively receive in engagement therewith either a rechargeable battery or a non-rechargeable battery, said charging contacts adapted to deliver charging current to the load terminals of said battery, said battery charging system adapted to expose a battery in the system to electromagnetic radiation and to switch said battery charging system between a non-charging mode and a charging mode, said rechargeable battery comprising:
    a housing of a size and configuration permitting said rechargeable battery to be received by said charging contacts which alternatively receive non-rechargeable batteries;
    a pair of load terminals for delivering current to a load, said load terminals adapted to electrically engage said pair of charging contacts and to receive charging current therefrom; and
    resonance means included in said housing which is responsive to the electromagnetic radiation from said battery charging system for indicating to said system that the battery is rechargeable.

11. The invention as set out in claim 10 in which said resonance means is electrically isolated from said external load terminals when said rechargeable battery is either in or out of said battery charger system.

12. The invention as set out in claim 10 in which said resonance means is a tank circuit formed by conductive material residing on a hollow cylinder fitted over the conventional housing for said battery.

13. The invention as set out in claim 12 in which said cylinder is made of dielectric material and said cylinder has conductive material on its inner and outer surface which form at least one capacitor.

14. The invention as set out in claim 10 in which said resonance means absorbs the energy of said electromagnetic radiation so as to indicate the presence of said rechargeable battery.

15. A battery charging system adapted to distinguish a rechargeable secondary battery from a non-rechargeable primary battery, both said batteries being of substantially the same size and configuration, said system comprising:
    a rechargeable secondary battery having first and second external load terminals for delivering electrical energy to an energy-using device;

a charging circuit for delivering charging current to said secondary battery;

signal means providing an electromagnetic signal to said secondary battery;

circuit means in said secondary battery responsive to the electromagnetic signal from said signal means for generating an indication that said secondary battery is a rechargeable battery; and enabling means responsive to the indication from said circuit means that said secondary battery is rechargeable for enabling the battery charging circuit to deliver charge current to said secondary battery only when the indication from said circuit means is detected.

16. The invention as set forth in claim 15 wherein said circuit means is electrically isolated from said external load terminals of said battery.

17. The invention as set forth in claim 15 wherein said circuit means comprises an inductance and capacitance which cause said circuit means to exhibit a resonance characteristic in the presence of said electromagnetic signal from said signal means.

18. The invention as set forth in claim 17 wherein said enabling means is responsive to the increased current through said signal means caused by the resonance of said circuit means.

19. The invention as set forth in claim 18 wherein said enabling means includes a current detector which detects the increase in current in said signal means caused by the resonance of said circuit means in response to said electromagnetic signal from said signal means.

20. The invention as set forth in claim 15 wherein said circuit means comprises a hollow cylinder fitted over an outer jacket housing of said secondary battery, said cylinder including a conductive pattern which creates a circuit which will respond resonantly when exposed to the electromagnetic signal of said signal means.

21. The invention as set forth in claim 15 wherein said charging circuit delivers charging current to said rechargeable secondary battery by way of said first and second external load terminals.

* * * * *